US009037717B2

(12) United States Patent
Canturk et al.

(10) Patent No.: US 9,037,717 B2
(45) Date of Patent: May 19, 2015

(54) VIRTUAL MACHINE DEMAND ESTIMATION

(75) Inventors: Isci Canturk, Hawthorne, NY (US); James E. Hanson, Hawthorne, NY (US); Jeffrey O. Kephart, Hawthorne, NY (US); Malgorzata Steinder, Hawthrone, NY (US); Ian N. Whalley, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 12/563,445

(22) Filed: Sep. 21, 2009

(65) Prior Publication Data
US 2011/0072138 A1 Mar. 24, 2011

(51) Int. Cl.
G06F 15/173 (2006.01)
G06F 9/50 (2006.01)

(52) U.S. Cl.
CPC ............. G06F 9/5011 (2013.01); *Y02B 60/142* (2013.01); *G06F 2209/504* (2013.01)

(58) Field of Classification Search
CPC .............. G06F 9/45504; G06F 9/4856; G06F 2009/4557; G06F 9/45558; H04L 47/125
USPC ........................................................ 709/226
See application file for complete search history.

(56) References Cited

U.S. PATENT DOCUMENTS 6,215,772 B1 * 4/2001 Verma ........................... 370/236
7,716,446 B1 * 5/2010 Chen et al. .................... 711/170
2006/0064687 A1 3/2006 Dostert
2007/0006218 A1 1/2007 Vinberg et al.
2007/0162720 A1 7/2007 Branda et al.
2007/0300239 A1 * 12/2007 Adam et al. ................... 719/320
2008/0222025 A1 9/2008 Fellenstein et al.
2008/0288941 A1 11/2008 Adams et al.
2008/0301473 A1 12/2008 Perez et al.
2009/0006878 A1 * 1/2009 Borghetti et al. ............. 713/340
2009/0113422 A1 4/2009 Kani
2009/0164356 A1 6/2009 Bakman
2010/0131959 A1 * 5/2010 Spiers et al. .................. 718/105
2010/0191854 A1 * 7/2010 Isci et al. ...................... 709/226

OTHER PUBLICATIONS

Frank Vahid, "The Softening of Hardware," Computer, vol. 36, No. 4, pp. 27-34, Apr. 2003, doi:10.1109/MC.2003.1193225.*
Steve McConnell, "Who Needs Software Engineering?," IEEE Software, vol. 18, No. 1, pp. 5-8, Jan./Feb. 2001, doi:10.1109/MS.2001.903148.*
Andrew Tanenbaum, Structured computer organization; (2nd ed.), Prentice-Hall, Inc., Upper Saddle River, NJ, 1984.*
Black-box and Gray-box Strategies for Virtual Machine Migration. Timothy Wood, Prashant Shenoy, Arun Venkataramani, and Mazin Yousif. Fourth Symposium on Networked Systems Design and Implementation (NSDI), Apr. 11-13, 2007.*

(Continued)

*Primary Examiner* — June Sison
(74) *Attorney, Agent, or Firm* — Cantor Colburn LLP; Preston Young

(57) ABSTRACT

A method for use in a system in which computational entities are distributed across physical computing resources to place the entities on the resources includes estimating actual resource demand for each entity on each resource based on application resource usage data collected from a data source external from the entity, computing a best allocation of the resources to the entities from the estimated actual resource demand for each entity and distributing the resources to the entities in accordance with the computed best allocation.

22 Claims, 6 Drawing Sheets

(56) References Cited

OTHER PUBLICATIONS

IEEE article "Dynamic Placement of Virtual Machines for Managing SLA Violations" (May 21-25, 2007) to Bobroff et al. ("Bobroff").*

Hongzhang Shan et al., "Job Superscheduler Architecture and Performance in Computational Grid Environments," SC'03, pp. 1-15.
Chapin, Steve J. et al., "Support for Implementing Scheduling Algorithms Using Messiahs," pp. 1-27, 1994.

* cited by examiner

| t: | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| VM1: | U | R | R | R | R | U | R | R | R | R | R | R | R | R | R | U | W | R | R | R | U | R | R | R |
| VM2: | U | R | R | R | R | U | R | R | R | R | U | R | R | R | R | U | W | R | R | R | R | R | R | R |
| VM3: | R | U | U | R | R | R | U | R | R | U | R | U | R | R | R | R | U | W | R | R | R | U | U | U |
| VM4: | R | U | U | R | R | R | U | R | R | U | R | U | U | R | R | R | U | W | R | R | R | U | U | U |
| VM5: | R | R | U | R | R | R | R | U | R | R | R | R | U | R | R | R | R | U | W | R | R | R | R | R |
| VM6: | R | R | R | U | R | R | R | U | R | R | R | R | U | R | R | R | R | U | W | R | R | R | R | R |
| VM7: | R | R | R | U | R | R | R | R | U | R | R | R | R | U | U | R | R | R | U | W | W | R | R | R |
| VM8: | R | R | R | R | U | R | R | R | U | R | R | R | R | U | R | R | R | R | U | W | R | R | R | U |
| VM9: | R | R | R | R | R | U | R | R | R | U | R | R | R | R | R | R | R | R | R | U | U | R | R | R |
| VM10: | R | R | R | R | R | U | R | R | R | U | R | R | R | R | U | R | R | R | R | R | W | R | R | R |

U: Used | R: Ready | W: Wait

FIG. 3

| VM | Host | CPU Usage(%) | Est. Demand2(%) | Total Cap. Check(%) |
|---|---|---|---|---|
| venturev003 | venturep005.wat | 46.67 ( 9.78) | 94.02 ( 10.48) | 99.84 (100.16) |
| venturev004 | venturep005.wat | 44.66 ( 8.92) | 82.14 ( 9.46) | 99.90 (100.16) |
| venturev005 | venturep005.wat | 43.79 ( 8.41) | 68.51 ( 8.76) | 99.91 (100.17) |
| venturev006 | venturep005.wat | 34.15 ( 7.11) | 48.03 ( 7.25) | 99.95 (100.18) |
| venturev007 | venturep005.wat | 21.38 ( 4.89) | 29.74 ( 4.90) | 100.12 (100.20) |

CAPACITY MOVE ACTIONS:

VM venturev005: Migrating venturep005.watson.ibm.com -> venturep006.watson.ibm.com
VM venturev006: Migrating venturep005.watson.ibm.com -> venturep006.watson.ibm.com
VM venturev007: Migrating venturep005.watson.ibm.com -> venturep006.watson.ibm.com
- CAPACITY MOVE ACTIONS DONE -

FIG. 6

VIRTUAL MACHINE DEMAND ESTIMATION

BACKGROUND

Aspects of the present invention are directed to a method and a system for virtual machine CPU demand estimation for autonomous resource and power management.

In a virtualized environment, the physical hardware is decoupled from the operating system and application software via a hypervisor layer. In such environments, resource consolidation is a commonly applied technology that is enabled by computing hardware virtualization. The hypervisor helps multiple virtual machines (VMs), which may run different operating systems on different virtual hardware, share the same physical resources.

Current virtualization technologies incorporate management schemes that present a unified resource view for multiple virtualized hosts and provide methods for dynamic resource balancing among these hosts by, e.g., migrating VMs between resources. Such resource balancing requires explicit knowledge of each VM's resource demand to commit resources efficiently. One key challenge in these processes is the determination of the actual desired resource demand of each VM. In a case where a host is undercommitted and has more resources than the total demand produced by its occupant VMs, each VM's resource usage tracks demand closely. However, in the case where a host is overcommitted and had less resources than the total demand produced by its occupant VMs, VM resource usage deviates from demand. This latter case is far more important in terms of resource balancing and may lead to VM performance degradation. In overcommitment, the existing solutions have drawbacks in that they either use resource usage, such as each VM's CPU usage percent, as an indicator of demand or they may rely on legacy implementations tightly coupled with the underlying virtualization technology for specific implementations.

Generally, it is seen that some of the existing techniques either explicitly rely on CPU usage or introduce disruptive hooks to the overlaying virtualized applications for resource management and capacity planning. Some of these proposed techniques argue for the necessity of application-level intervention to distinguish demand from usage. While other work also argues that demand does not necessarily follow usage in both native and virtualized systems and points out some of the indicators of resource contention, they do not provide an estimation technique. Other work that proposes virtual machine performance modeling and estimation techniques rely on tracking virtual machine resource usage/demand and develop forecasting or application-level performance modeling techniques. These studies are not applicable for arbitrary black-box virtualization management (that is, virtualization management done without any monitoring hooks inside the VMs, where VMs are treated as black boxes) cases, and do not provide a general representation of actual VM resource demand. Some solutions aim to address the problem of identifying the resource requirements of a VM. These solutions rely on determining resource needs from within a virtual machine by inspecting application and operating system behavior within the VM to track certain indicative behavior such as detecting the occurrences of an idle loop within a virtual machine. In an approach for hypervisor load balancing, information about the VM CPU load is determined based on its interrupt response time. While this technique provides indirect measures on whether a VM is receiving its resource requirements, it is generally intrusive and does not provide a direct measure of a VM's actual resource demand.

SUMMARY

In accordance with an aspect of the invention, a method for use in a system in which computational entities are distributed across physical computing resources to place the entities on the resources is provided. The method includes estimating actual resource demand for each entity on each resource based on application resource usage data collected from a data source external from the entity, computing a best allocation of the resources to the entities from the estimated actual resource demand for each entity and distributing the resources to the entities in accordance with the computed best allocation.

In accordance with another aspect of the invention, a method for estimating actual resource demand for running entities is provided and includes obtaining a map of the entities relative to resources, obtaining resource usage metrics for each entity and resource, obtaining resource capacities and computing the estimated actual resource demand based on the map of the entities relative to the resources, the resource usage metrics and the resource capacities.

In accordance with another aspect of the invention, a system, in which computational entities are distributed across physical computing resources to place the entities on the resources, is provided. The system includes a processor and a computer readable medium coupled to the processor having executable instructions stored thereon, which, when executed instruct the processor to estimate actual resource demand for each entity on each resource based on application resource usage data collected from a data source external from the entity, to compute a best allocation of the resources to the entities from the estimated actual resource demand for each entity and to distribute the resources to the entities in accordance with the computed best allocation.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 3 is a table illustrating an exemplary resource consolidated environment in which virtual machines (VMs) are consolidated on a single host;

FIG. 6 is a snapshot of evaluation results of demand estimation tests.

DETAILED DESCRIPTION

Figure 1:
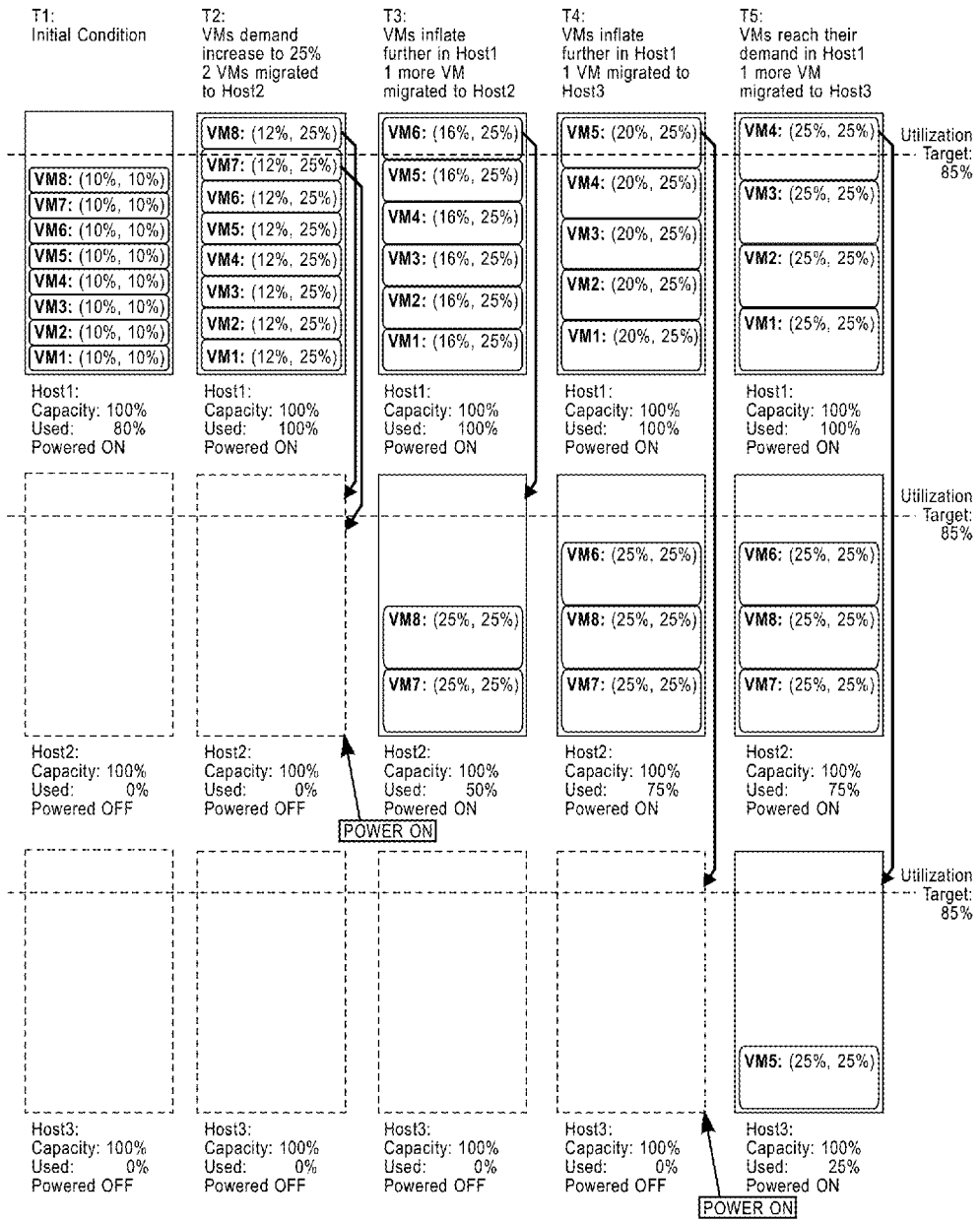
FIG. 1 is a schematic diagram of a resource consolidated environment, and its operation without the employment of demand estimation as disclosed in this invention.

With reference to FIG. 1, an exemplary system includes a virtualized cluster with 3 hosts, each with total CPU capacity of 100%, and 8 virtual machines (VMs). Dynamic placement aims to balance resources for use by the VMs such that each host's utilization does not, for example, exceed 85%. Dynamic placement also employs power management such that if the total resource demand by the VMs can be satisfied with fewer than 3 hosts, the remaining hosts are powered down. When the demand rises, the hosts are powered back on to satisfy the demand. In this example, the VMs are initially close to idle (each demanding 10% CPU) and, they fit within a single host (8×10%=80%<85%), they all reside in a single host with the other two machines powered down. When each VM's demand increases to 25% a dynamic resource manager uses resource usage as a measure of demand to respond in the absence of the demand estimation of the invention and an iterative process including 5 separate decisions that converges to the placement of resources.

In the present disclosure embodiments, desired resource demand of the VMs is captured initially and guides dynamic resource balancing actions in a single operation. That is, the resource management actions performed in steps T2-T5 of FIG. 1 are realized in a single operation with demand estimation. This is achieved using scheduling statistics commonly available to operating systems and hypervisors to derive reliable estimates for actual VM resource demand.

Figure 2:
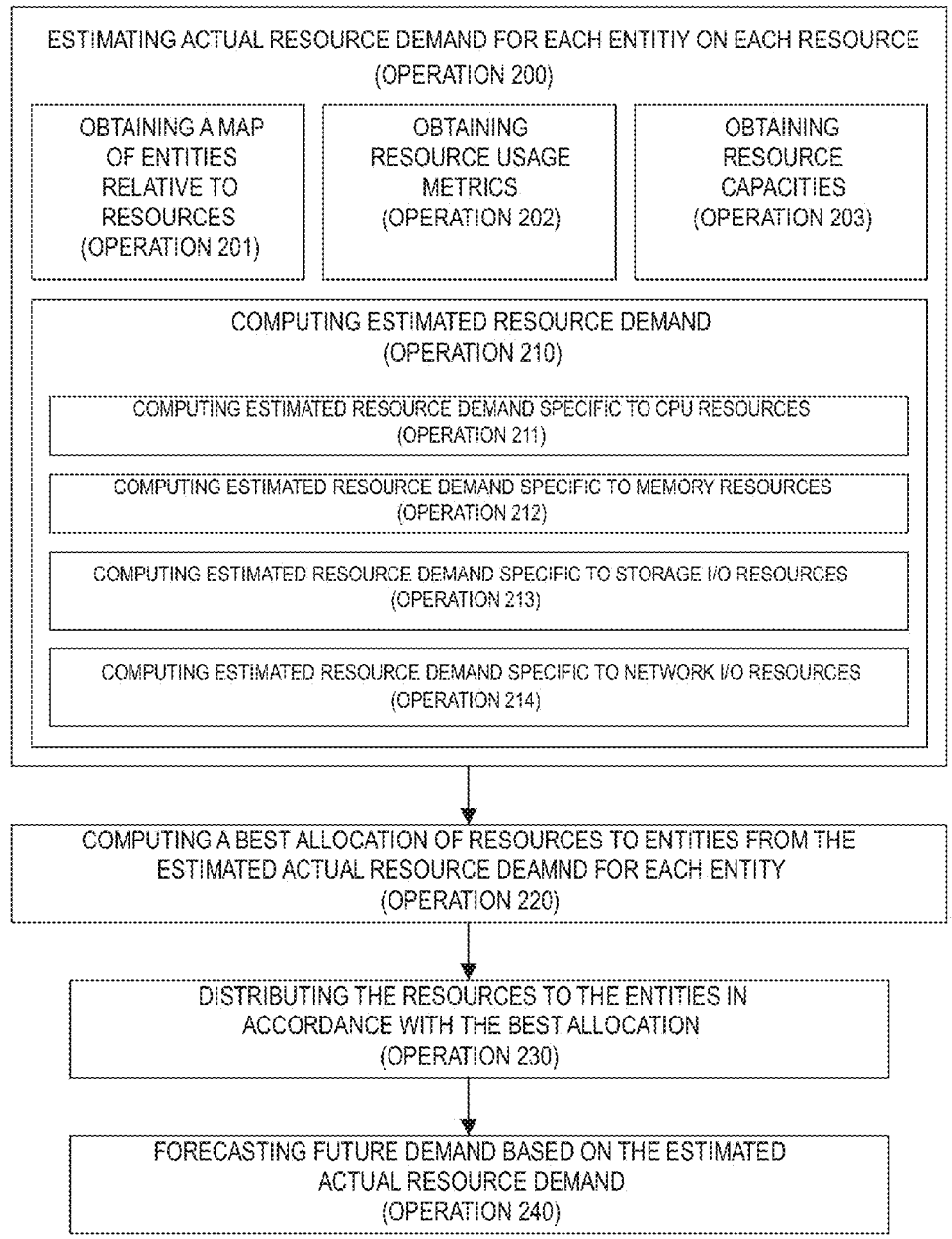
FIG. 2 is a flowchart illustrating a method to place entities on resources in accordance with embodiments of the invention.

With reference to FIG. 2, a method for use in a system in which computational entities are distributed across physical computing resources to place the entities on the resources is provided as described above. This includes estimating actual resource demand for each entity on each resource based on application resource usage data collected from a data source external from the entity 200, such as a hypervisor, computing a best allocation of the resources to the entities from the estimated actual resource demand for each entity 220, and distributing the resources to the entities in accordance with the computed best allocation 230.

The estimating of operation 200 may include obtaining a map of the entities relative to the resources 201, obtaining resource usage metrics for each entity and resource 202, obtaining resource capacities 203 and computing the estimated actual resource demand based on the map of the entities relative to the resources, the resource usage metrics and the resource capacities 210. The resource capacities may be potentially time-varying due to employment of dynamic power/performance management techniques (such as dynamic voltage and frequency scaling, dynamic memory sizing), resource reservations, dynamically-varying system resource requirements, and other contributors.

The computing of the estimated resource demand of operation 210 may further include computing estimated actual resource demand specific to CPU resources 211, computing estimated actual resource demand specific to memory resources 212, computing estimated actual resource demand specific to storage I/O resources 213 and computing estimated actual resource demand specific to network I/O resources 214.

In accordance with embodiments of the invention, the computing of the estimated actual resource demand specific to CPU resources 211 may include obtaining CPU resource usage metrics for each entity and resource, obtaining CPU resource capacities for each resource and computing actual resource demand specific to CPU resources for each entity from the CPU resource usage metrics and the CPU resource capacities. Here, The CPU resource usage metrics may include CPU cycles during which the entity was actually granted the use of the CPU resources, CPU cycles during which the entity was ready to use the CPU resources, CPU cycles during which the entity was waiting on a resource other than the CPU and CPU cycles during which the entity was idle. The CPU resource usage metrics may further include CPU cycles during which the resource performed system-related operations. The CPU resource capacities may include available CPU cycles aggregated over all available logical processing units enclosed by the resource.

In accordance with further embodiments of the invention, the computing of the estimated actual resource demand specific to memory resources 212 may include obtaining memory resource usage metrics for each entity and resource, obtaining memory resource capacities for each entity and resource and computing actual resource demand specific to memory resources for each entity from the memory resource usage metrics and the memory resource capacities. Here, the memory resource usage metrics may include an amount of memory that is active for each entity, an amount of memory that is mapped for each entity, an amount of memory that is swapped for each entity, an amount of memory that is shared with other entities and an amount of reserved memory. The memory resource capacities may include available and configured memory for each resource.

In accordance with further embodiments of the invention, the computing of the estimated actual resource demand specific to storage I/O resources 213 may include obtaining storage resource usage metrics for each entity and resource, obtaining storage resource capacities for each entity and resource and computing actual resource demand specific to storage I/O resources for each entity from the storage resource usage metrics and the storage resource capacities. Here, the storage resource usage metrics may include storage read and write rates for each entity, storage read and write requests for each entity, storage read and write latencies for each entity and resource and storage device read and write queue lengths for each resource. The storage resource capacities may include storage bandwidth for each resource.

In accordance with further embodiments of the invention, the computing of the estimated actual resource demand specific to network I/O resources 214 may include obtaining network resource usage metrics for each entity and resource, obtaining network resource capacities for each entity and resource and computing actual resource demand specific to network I/O resources for each entity from the network resource usage metrics and the network resource capacities. Here, the network resource usage metrics include network packet transfer and receive rates for each entity and resource, packet transfer and receive latencies for each entity and transmit and receive queue lengths and latencies for each resource. The network resource capacities may include available network bandwidth for each resource and configured network bandwidth for each entity.

The methods described above may be embodied in a system, in which computational entities are distributed across physical computing resources to place the entities on the resources. The system may include a processor and a computer readable medium coupled to the processor having executable instructions stored thereon. When executed, the executable instructions instruct the processor to estimate actual resource demand for each entity on each resource based on application resource usage data collected from a data source external from the entity, to compute a best allocation of the resources to the entities from the estimated actual resource demand for each entity and to distribute the resources to the entities in accordance with the computed best allocation.

Demand estimation of aspects of the present invention generally relies on basic scheduling metrics. As shown in Table 1 below, the scheduling metrics may include CPU Used, CPU Wait, CPU Ready and CPU System metrics. The CPU Used metric refers to a time spent while the CPU is in use. The CPU Wait metric refers to a time spent waiting for some resource other than the CPU. The CPU Ready metric refers to a time spent waiting for the CPU to be available. The CPU System metric refers to a time spent in the hypervisor/kernel.

TABLE 1

CPU scheduling statistics used in demand estimation:

| | |
|---|---|
| CPU Used | Time spent while using the CPU |
| CPU Wait | Time spent waiting for some resource other than the CPU |
| CPU Ready | Time spent waiting for the CPU to be available |
| CPU System | Time Spent in the hypervisor/kernel |

The metrics can be defined for each VM, as well as each physical processor. The demand estimation method then uses the statistics gathered for each VM over a sampling period T that is smaller than the average decision making period used by a dynamic resource balancing mechanism. It is understood that while demand estimation relates to computing resource management as described herein, it may also be applied to memory, bandwidth and/or other similar computing resources.

The CPU Used metric tracks an amount of time a VM was actually running on a physical processor. The amount of time reported in these metrics may be considered as a portion of the sampling period T. For example, for a case in which T=20 seconds, if the CPU Used metric is found to be 10 seconds, this translates to 50% CPU usage for the VM. The CPU Wait metric describes a time spent waiting on some other resource such as a disk or a network input/output (I/O) unit. During wait time, the VM cannot progress even if there is an available CPU resource since this resource is effectively blocked. The CPU Ready metric captures a time during which the VM was ready to run on the CPU, but had to relinquish the processor to some other VM or task computing for the same resource. During ready time, the VM could actually make useful progress had it been given more processing resources. The CPU System metric represents a time spent in lower-level operations such as hypervisor or kernel tasks and may be an important component in VM CPU accounting.

Insights relevant to demand estimation are drawn from these metrics. For example, for an idle VM, used and ready times are close to 0 seconds, while wait time is around 100%. For a completely CPU-bound VM, the sum of used and ready times is expected to by approximately 100%. In general, the sum of all the four metrics is expected to approximate total elapsed time for a VM. The CPU demand estimate for a VM follows from these insights. The VM is expected to be in one of the four states described by the metrics and the distribution of VM CPU time to these states depends on an amount of physical resources available to the VM and each VM's actual desired demand.

With reference to FIG. 3, a hypothetical example demonstrates how the VM time is distributed during the lifetime of a VM. System time is omitted in the description for clarity. FIG. 3 shows an example where 10 VMs are consolidated on a single host. The host has 2 physical CPUs aggregating to a total CPU capacity of 200%. Each VM has a CPU demand of 80%. In the example, t represents an arbitrary time quantum during which only a pair of the VMs can run on the two physical cores. For simplicity, we assume the VMs get their turns to run in a pairwise round-robin fashion. That is, at t=1, VM1 and VM2 run, while the remaining are eight VMs wait their turn; at t=2, VM3 and VM4 acquire the cores, while the others wait; and so on. In addition the VM load is constructed such that each VM wants to perform CPU operations worth 4t time, followed by a 1t idle period. This load pattern is repeated with this 5t period to achieve the 80% CPU demand over a sampling period T>>5t. The three different states are represented with U (CPU Used), W (CPU Wait) and R (CPU Ready). The columns of the figure represent the timeslices in t, and the whole chart from left to right shows the execution timeline of the 10 VMs.

At t=1, all VMs are ready to run. The first two VMs are scheduled on the physical processors and, therefore, they are in the U state. The other VMs stay in the R state, as they are ready to run, but there are no available CPUs. At t=2, VM1 and VM2 relinquish the CPUs, which are then allotted to VM3 and VM4, which go into the U state. The same pattern continues until t=16. At this point, VM1 and VM2 run for the fourth t interval. After this, they have completed their CPU-bound operation worth 4t CPU time and they remain idle for 1t. This is indicated with the W state. That is, at this point VM1 and VM2 are not competing for the CPU resources. The following VMs enter the U state to perform their fourth t interval of CPU-bound execution and consecutively go into W state. The VMs go back into R state after the W state when they start competing for resources again after idling for the 1t interval. As the highlighted region shows, the whole 10VM execution pattern shows a fundamental period of 20t. Therefore, a sampling interval T>>20t shall capture a similar distribution of states as shown in the highlighted 20t region.

Focusing on the representative 20t region, each VM shows a state distribution of {U=4t, W=1t, R=15t}. While the amount spent in R is generally dependent on the amount of competition between VMs, W and U can be expected to be moderately consistent regardless of the level of overcommitment. As such, it is seen that the demand of the VMs is captured by a ratio of how much the VMs are in the U and W states and that a ratio of the CPU Used time (4t) to the sum of CPU Used and CPU Wait times (5t) represents the actual CPU demand of the VMs (80%). Thus, an estimated actual demand for a VM can be represented as:

$$\text{CPU\_Demand} \approx \frac{\text{Used}(+\text{System})}{\text{Used}+\text{Wait}(+\text{System})} = \frac{\text{Used}(+\text{System})}{\text{Stats\_Period}-\text{Ready}}$$

This equation shows an approach to VM CPU demand estimation, which relies on the use of scheduling parameters for a hypervisor. An additional "system" component is also included in the above equation. This represents a small overhead component for the time spent in local hypervisor resource management processes that is not attributed to the U, R and W states. While the equation shows the conceptual derivation of VM CPU demand, an analytical representation can be derived as shown in FIG. 4.

Figure 4:
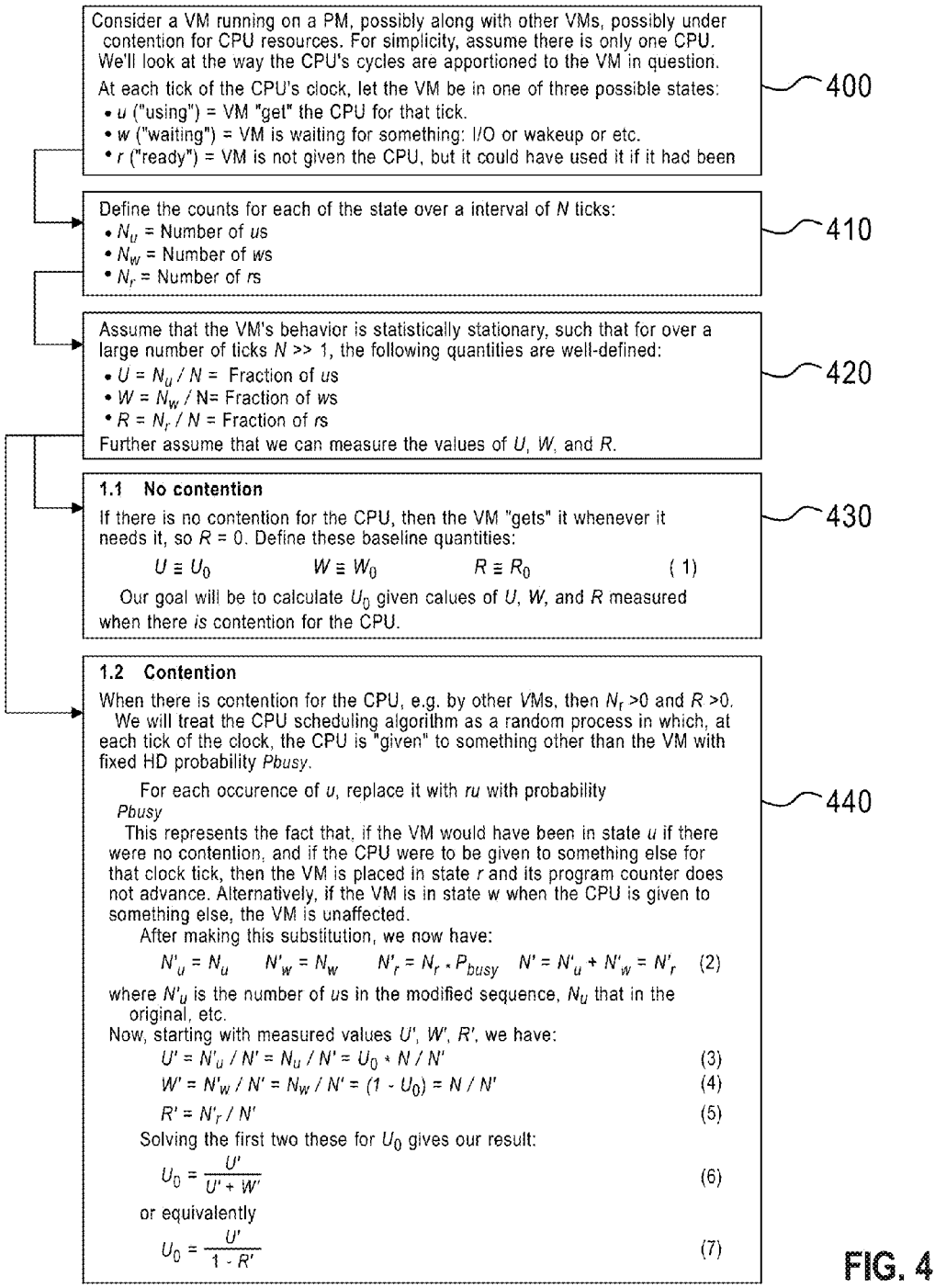
FIG. 4 is a flow chart illustrating an analytical derivation of VM CPU demand estimation.

As shown in FIG. 4, at operation 400, at each tick of a CPU clock a VM is assumed to be in a "u" state, where the VM gets to use the CPU for that tick, a "w" state, where the VM is waiting for an I/O wakeup, as an example, or an "r" state where the VM is not given access to the CPU but could have used it had it been. Next, at operation 410, counts for each state over an interval of N ticks are defined as $N_u$ (the number of "u" state seconds), $N_w$ (the number of "w" state seconds) and $N_r$ (the number of "r" state seconds). It is then assumed, at operation 420, that the VM's behavior is statistically stationary, such that for over a large number of ticks, where N>>1, the following quantities are well defined and measurable: U=$N_u$/N=Fraction of "u" seconds, W=$N_w$/N=Fraction of "w" seconds, and R=$N_r$/N=Fraction of "r" seconds.

If, at operation 430, it is determined that there is no contention for the CPU, the VM gets access to the CPU resources whenever it needs such access and it is known that R=O. Here, baseline quantities of U=$U_0$, W=$W_0$ and R=$R_0$=0 are defined with the goal being to calculate $U_0$ given values of U, W and R measured when there is contention for the CPU. When there is contention for the CPU, at operation 440, the CPU scheduling algorithm is treated as a random process in which, at each tick of the clock, the CPU is given to something other than the VM with a fixed probability. In this way, it may be represented that, if the VM would have been in state "u" if there were no contention, and if the CPU were to be given to something else for that clock tick, then the VM is placed in the "r" state and its program counter would not advance. Alternatively, if the VM is in the "w" state when the CPU is given to something else, the VM is unaffected. This substitution leads to the desired equations:

$$U_0 = \frac{U}{U+W} = \frac{U}{1-R}$$

Figure 5:
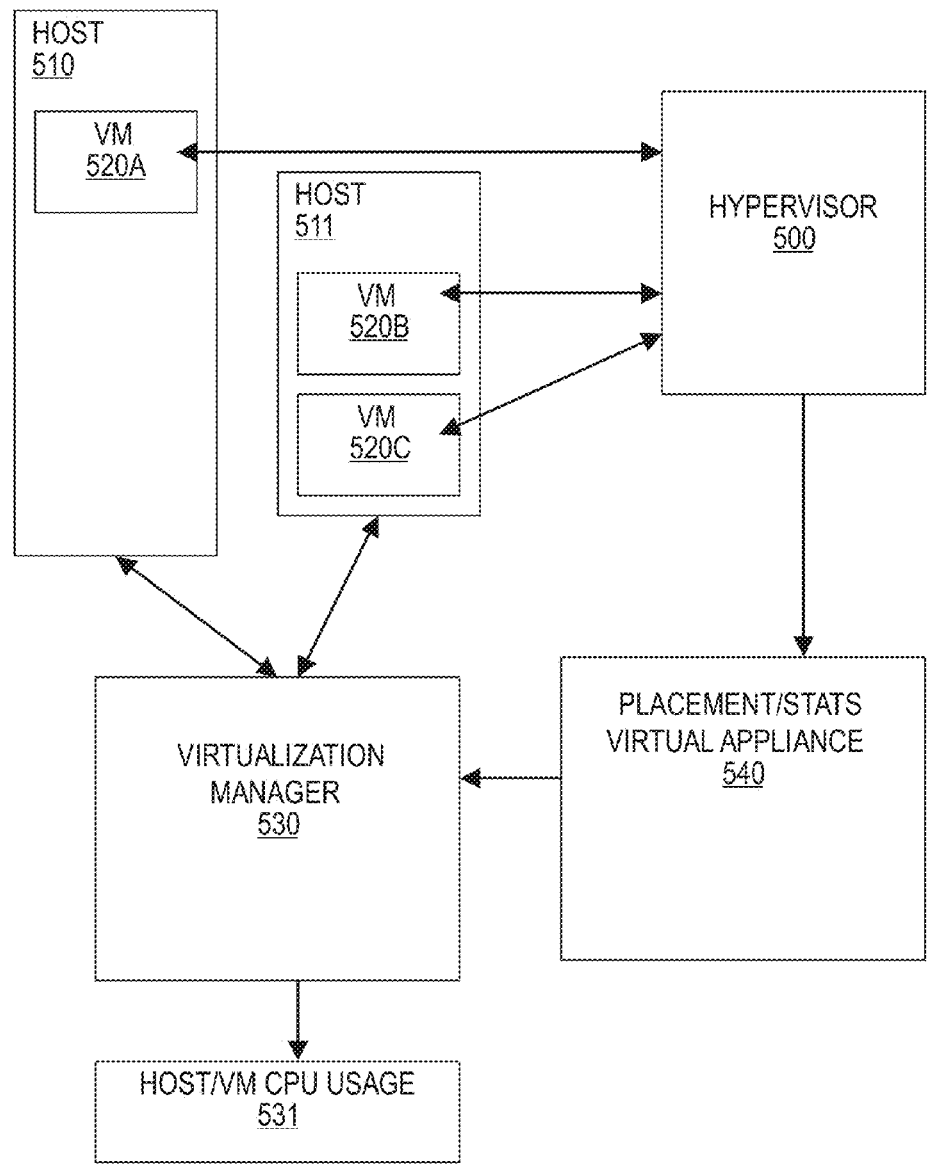
FIG. 5 is a schematic illustration of a virtualized environment in accordance with embodiments of the present invention.

With reference to FIG. 5, demand estimation may be implemented and validated in an embodiment of a virtualized environment using, for example, one or more hypervisors 500, such as VMware hypervisors, and VMs 520A-C, such as Linux VMs, which are distributed across hosts 510, 511. A virtualization manager 530 collects host/VM CPU usage stats in an aggregator 531 and stored in a virtual appliance 540. This exemplary validation prototype is implemented as a virtual appliance application programming interface (API) client that gathers the described VM CPU statistics from the hypervisors and as an integrated dynamic resource balancing engine that performs resource management and dynamic placement. In other embodiments, demand estimation can be carried out by agents in individual hypervisors or as part of a general virtualization management endpoint. Experiments similar to the case shown in FIG. 1 have been conducted in the prototype implementation of FIG. 5 and indicate that demand estimation relatively accurately captures VM resource demand and that demand estimation eliminates the iterative progress described in FIG. 1. Demand estimation therefore enables a dynamic placement engine to perform correct resource balancing actions in a single operation.

FIG. 6 shows an actual snapshot of evaluations for an experimental case with 2 hosts and 5 VMs. In FIG. 5, VMs are configured to have different levels of demand as shown in Table 2, so that an effectiveness of demand estimation can be verified for accuracy in a general/realistic scenario.

TABLE 2

CPU demand configurations for a case in which five VMs are used in demand estimator validation:
CPU Demand

| | |
|---|---|
| VM1 | 100% |
| VM2 | 80% |
| VM3 | 60% |
| VM4 | 40% |
| VM5 | 20% |

In FIG. 6, the top highlighted regions show the observed CPU usage and the demand estimation, which tracks actual VM CPU demand relatively closely. The lower area shows the impact of demand estimation in dynamic resource balancing. The placement engine identifies and performs three live migrations to satisfy the actual demand of all VMs in the cluster in a single operation.

The case shown in FIG. 6 corresponds to the same initial state of the scenario described in FIG. 1, where all VMs reside in the first host. In this case, the estimator identifies the actual demand of each VM with reasonable accuracy. As a result, dynamic placement performs all the necessary balancing actions immediately. In other words, all the intermediate steps of FIG. 1 are merged to a single correct action.

Table 3 shows the timeline of the actual placement decisions applied in this example with and without demand estimation. Without demand estimation, dynamic placement progresses in an iterative fashion, similar to FIG. 1. In contrast, with demand estimation, all of the necessary balancing actions are completed in a single iteration.

TABLE 3

Timeline of dynamic placement actions, with and without demand estimation:

| Timeline | Without Demand Estimation | With Demand Estimation |
|---|---|---|
| Iteration 1 | Migrate VM5 → Host2 | Migrate VM5, VM4 & VM3 → Host2 |
| Iteration 2 | Migrate VM4 → Host2 | ALL DEMANDS MET |
| Iteration 3 | Migrate VM3 → Host2 | |
| Iteration 4 | ALL DEMANDS MET | |

In accordance with further embodiments of the invention, relative priorities of VMs can be changed, resource caps on VMs can be introduced, resource guarantees for certain VMs can be provided. In each case, the demand estimate approach performs in a similar fashion as demonstrated above. The individual VM performances however show different characteristics as dictated by the applied resource constraints.

While the discussed prototype focuses on homogeneous resources, demand estimation can also relate to heterogeneous resources. In the case of heterogeneous host configurations, if the demand estimate for a VM is seen to be less than 100% (minus an empirically-determined threshold for resilience against measurement fluctuations) of host capacity, this demand can be translated into another host by carrying over absolute resource requirements. The case where the VM demand is seen to be close to 100% can be handled as a special case. In this case, the VM is known to desire at least as much as its current host's capacity. Therefore, for another host with lower capacity than the VM's current host, it is known that the VM demand exceeds 100% of that host's capacity. This can be represented as either a percentage greater than 100% or by using absolute resource demand measures. For another host with capacity higher than the VM's current host, the actual demand of the VM can be estimated within a range. It is known that, the demand can be at least as much as the original host's resource capacity. This capacity translates into a percentage that is lower than 100% in the other (bigger-capacity) host. This measure constitutes a lower bound on VM demand. As the new measured demand cannot exceed capacity of the other host, the VM demand can be only as high as 100% of the other host's capacity. Thus, a demand of 100% constitutes an upper bound for conservatively estimating such a VM's demand on another, bigger-capacity host. For performance-efficient placement, this conservative estimate relatively cautiously assumes the upper bound of the possible range of VM resource demand.

In addition to improving the power/performance efficiency of virtualized environments, the improved demand estimates provided by the proposed invention can be employed for other purposes.

A first additional purpose for which the invention may be employed is to improve the effectiveness of forecasting approaches that predict future resource demand of VMs. Without demand estimation, a forecasting approach that aims to discern trends and patterns from past resource usage history is exposed to spurious and potentially sharp changes in these historical measurements. These spurious shifts in past resource usage history occur because the patterns for each VM are susceptible to both other VMs' dynamically-varying application characteristics and the dynamic placement decisions as they work to correct any resource overcommitment.

In contrast, a forecasting approach that takes into account the actual demand created by a VM is exposed to a representative view of the actual VM behavior that is only dependent on the same VM's own application characteristics. Such a forecasting approach is not misdirected by inter-VM influences on resource usage and ongoing dynamic placement decisions.

A second additional purpose for which the invention may be employed is to provide administrators directly with information about the evolution of demand over time, rather than feeding the demand estimate directly to an automated resource allocator. For example, the estimated actual demand of each VM (or application) over time could be plotted alongside the more traditional CPU utilization plot in the Graphical User Interface of a system administrator tool. If used in conjunction with forecasting (see, in FIG. 2, operation 240 of forecasting future demand based on the estimated actual resource demand), the GUI could also display a forecast of future demand, computed from the time series of estimated demands. As noted above, the future demand forecast would be more accurate and informative than a future CPU utilization forecast.

While the disclosure has been described with reference to exemplary embodiments, it will be understood by those skilled in the art that various changes may be made and equivalents may be substituted for elements thereof without departing from the scope of the disclosure. In particular, the disclosure can be applied to a more general set of computational entities than VMs, such as applications or processes. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method for use in a system in which computational entities are distributed across physical computing resources, the system including a processor and a non-transitory computer readable medium coupled to the processor and having executable instructions stored thereon, which, when executed instruct the processor to execute the method, which comprises:

tracking use time during which each entity runs on each resource, wait time during which each entity waits on a disk or input/output (I/O) unit, ready time during which each entity is ready to run on each resource but relinquishes the resource to another entity and system time for each entity;

calculating an estimated actual resource demand as a sum of use and system times divided by a sum of use, wait and system times and as the sum of use and system times divided by a result of ready time subtracted from a predefined statistics period;

computing a best allocation of the resources to the entities from the estimated actual resource demand for each entity such that, upon distribution of the resources to the entities, the resources will substantially satisfy the estimated actual resource demand for each entity; and distributing the resources to the entities in accordance with the computed best allocation, wherein the system time is representative of time spent in a local hypervisor resource management process.

2. The method according to claim 1, wherein the estimating comprises:

obtaining a map of the entities relative to the resources;

obtaining resource usage metrics for each entity and resource;

obtaining resource capacities; and computing the estimated actual resource demand based on the map of the entities relative to the resources, the resource usage metrics and the resource capacities.

3. The method according to claim 2, wherein the resource capacities are time-varying.

4. The method according to claim 2, wherein the computing of the estimated actual resource demand comprises:

computing estimated actual resource demand specific to CPU resources;

computing estimated actual resource demand specific to memory resources;

computing estimated actual resource demand specific to storage I/O resources; and computing estimated actual resource demand specific to network I/O resources.

5. The method according to claim 4, wherein the computing of the estimated actual resource demand specific to CPU resources comprises:

obtaining CPU resource usage metrics for each entity and resource;

obtaining CPU resource capacities for each resource; and computing actual resource demand specific to CPU resources for each entity from the CPU resource usage metrics and the CPU resource capacities.

6. The method according to claim 5, wherein the CPU resource usage metrics comprise:

CPU cycles during which the entity was actually granted the use of the CPU resources;

CPU cycles during which the entity was ready to use the CPU resources;

CPU cycles during which the entity was waiting on a resource other than the CPU; and CPU cycles during which the entity was idle.

7. The method according to claim 6, wherein the CPU resource usage metrics further comprise CPU cycles during which the resource performed system-related operations.

8. The method according to claim 5, wherein the CPU resource capacities comprise available CPU cycles aggregated over all available logical processing units enclosed by the resource.

9. The method according to claim 4, wherein the computing of the estimated actual resource demand specific to memory resources comprises:

obtaining memory resource usage metrics for each entity and resource;

obtaining memory resource capacities for each entity and resource; and computing actual resource demand specific to memory resources for each entity from the memory resource usage metrics and the memory resource capacities.

10. The method according to claim 9, wherein the memory resource usage metrics comprise:

an amount of memory that is active for each entity;
an amount of memory that is mapped for each entity;
an amount of memory that is swapped for each entity;
an amount of memory that is shared with other entities; and
an amount of reserved memory.

11. The method according to claim 9, wherein the memory resource capacities comprise available and configured memory for each resource.

12. The method according to claim 4, wherein the computing of the estimated actual resource demand specific to storage I/O resources comprises:
    obtaining storage resource usage metrics for each entity and resource;
    obtaining storage resource capacities for each entity and resource; and
    computing actual resource demand specific to storage I/O resources for each entity from the storage resource usage metrics and the storage resource capacities.

13. The method according to claim 12, wherein the storage resource usage metrics comprise:
    storage read and write rates for each entity;
    storage read and write requests for each entity;
    storage read and write latencies for each entity and resource; and
    storage device queue read and write latencies for each resource.

14. The method according to claim 12, wherein the storage resource capacities comprise storage bandwidth for each resource.

15. The method according to claim 4, wherein the computing of the estimated actual resource demand specific to network I/O resources comprises:
    obtaining network resource usage metrics for each entity and resource;
    obtaining network resource capacities for each entity and resource; and
    computing actual resource demand specific to network I/O resources for each entity from the network resource usage metrics and the network resource capacities.

16. The method according to claim 15, wherein the network resource usage metrics comprise:
    network packet transfer and receive rates for each entity and resource;
    packet transfer and receive latencies for each entity; and
    transmit and receive queue lengths and latencies for each resource.

17. The method according to claim 15, wherein the network resource capacities comprise:
    available network bandwidth for each resource; and
    configured network bandwidth for each entity.

18. The method according to claim 2, further comprising forecasting future demand based on the estimated actual resource demand.

19. A method for use in a system including a processor and a non-transitory computer readable medium coupled to the processor and having executable instructions stored thereon, which, when executed instruct the processor to estimate actual resource demand for running entities, the method comprising:
    obtaining a map of the entities relative to a number of resources;
    obtaining resource usage metrics for each entity and resource;
    obtaining resource capacities; and,
    based on the map of the entities relative to the resources, the resource usage metrics and the resource capacities;
    tracking use time during which each entity runs on each resource, wait time during which each entity waits on a disk or input/output (I/O) unit, ready time during which each entity is ready to run on each resource but relinquishes the resource to another entity and system time for each entity;
    calculating an estimated actual resource demand for each entity on each resource as a sum of use and system times divided by a sum of use, wait and system times and as the sum of use and system times divided by a result of ready time subtracted from a predefined statistics period,
    computing a best allocation of the resources to the entities from the estimated actual resource demand for each entity such that, upon distribution of the resources to the entities, a fewest possible number of the resources will substantially satisfy the estimated actual resource demand for each entity without exceeding an established utilization target, which is established as a percentage of total capacity for each resource, the percentage being less than 100% of the total capacity, and
    distributing the fewest possible number of the resources to the entities in accordance with the computed best allocation in a single distribution iteration and powering down a remaining number of the resources,
    wherein the system time is representative of time spent in a local hypervisor resource management process.

20. The method according to claim 19, wherein the estimating actual resource demand comprises:
    computing estimated actual resource demand specific to CPU resources;
    computing estimated actual resource demand specific to memory resources;
    computing estimated actual resource demand specific to storage I/O resources; and
    computing estimated actual resource demand specific to network I/O resources.

21. The method according to claim 19, further comprising forecasting future demand based on the estimated actual resource demand.

22. A system, in which computational entities are distributed across a number of physical computing resources to place the entities on the resources, the system including a processor and a non-transitory computer readable medium coupled to the processor and having executable instructions stored thereon, which, when executed instruct the processor to:
    establish a utilization target for each resource as a percentage of total capacity for each resource, the percentage being less than 100% of the total capacity,
    track use time during which each entity runs on each resource, wait time during which each entity waits on a disk or input/output (I/O) unit, ready time during which each entity is ready to run on each resource but relinquishes the resource to another entity and system time for each entity,
    calculate an estimated actual resource demand for each entity on each resource as a sum of use and system times divided by a sum of use, wait and system times and as the sum of use and system times divided by a result of ready time subtracted from a predefined statistics period,
    compute a best allocation of the resources to the entities from the estimated actual resource demand for each entity, such that, upon distribution of the resources to the entities, a fewest number of the resources will substantially satisfy the estimated actual resource demand for each entity without exceeding the established utilization target, distribute the fewest number of the resources to the entities in accordance with the computed best allocation in a single distribution iteration and power down a remaining number of the resources, wherein the system time is representative of time spent in a local hypervisor resource management process.

\* \* \* \* \*